(No Model.)
R. C. ANDERSEN.
COOKING UTENSIL.
No. 474,619. Patented May 10, 1892.
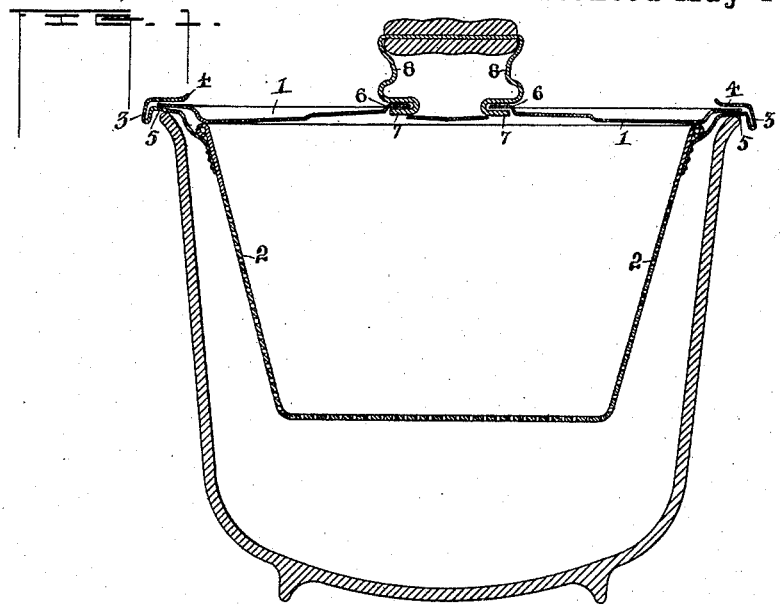
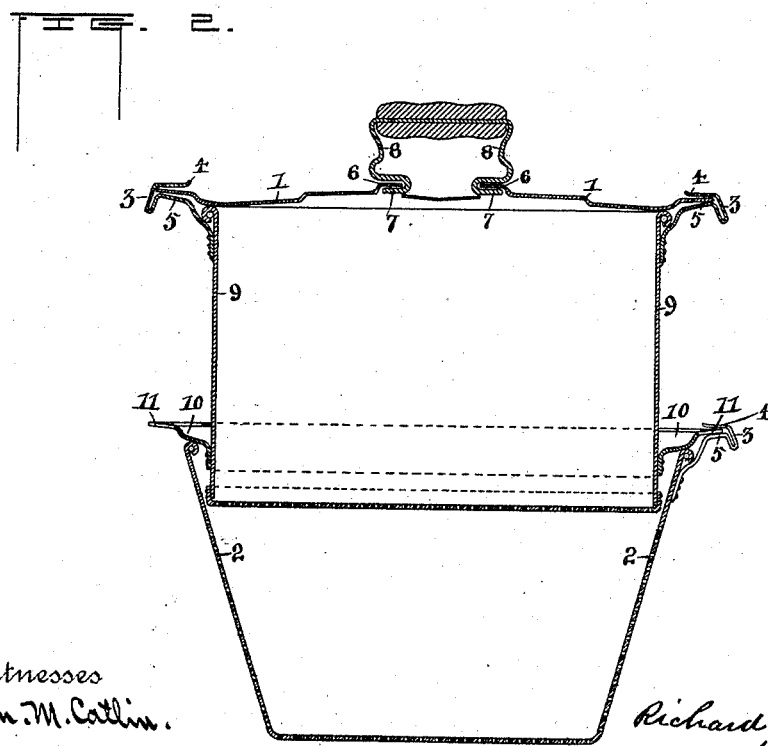
Witnesses
Arch. M. Catlin.
John Evans
Inventor
Richard C. Andersen
by
Benj. R. Catlin
Attorney

UNITED STATES PATENT OFFICE.

RICHARD C. ANDERSEN, OF PAWNEE CITY, ASSIGNOR OF ONE-HALF TO JOHN L. MARSHALL, OF LINCOLN, NEBRASKA.

COOKING UTENSIL.

SPECIFICATION forming part of Letters Patent No. 474,619, dated May 10, 1892.

Application filed July 2, 1891. Serial No. 398,283. (No model.)

*To all whom it may concern:*

Be it known that I, RICHARD C. ANDERSEN, a resident of Pawnee City, in the county of Pawnee and State of Nebraska, have invented certain new and useful Improvements in Cooking Utensils; and I do hereby declare the following to be a full, clear, and exact description of the invention, such as will enable others skilled in the art to which it pertains to make and use the same.

The object of the invention relates to a vessel for cooking food, usually styled a "steamer," and is an improvement upon devices claimed in my patent, No. 439,768, granted November 4, 1890; and it consists in the construction hereinafter described, and particularly pointed out in the claims.

In the accompanying drawings, Figure 1 is a vertical central section of the device suspended in a kettle, and Fig. 2 is a vertical central section of a steaming-vessel and supplementary steamer.

Numeral 2 represents a steaming-vessel having its walls perforated to a greater or less extent, as desired.

3 3 denote hooks or ears which have one end of each secured to the top of the vessel. The body of said hook is bent outwardly, then downwardly, and is then bent back upon itself and thereby made double, as shown, and has a free end 4 extended toward the vertical center of the vessel. Said free ends of the oppositely-placed hooks are adapted to receive under them and between them and the first-named outwardly-bent parts 5 a flat cover 1, the edge of which can be thrust between the parts 4 and 5 of the hooks. These are preferably elastic and hold the cover with a spring-like action. The hooks also serve to suspend the steamer in a kettle, and on account of their horizontal extension from the vessel they are adapted to be applied to kettles of various sizes, provided they reach across the top thereof.

In the top of the cover are formed horizontal grooves 6, opening toward each just above the surface of the cover and adapted to receive the outwardly-bent fingers 7 of the wire of the handle. These fingers or hooks 7 are bent in a flattened-S form, as shown, and the wire of the handle is sufficiently elastic to permit the two members 8 to be compressed, so that the fingers can be entered in the mouths of the grooves, whereupon they spring into place when the pressure upon them is relaxed. The handle is easily removed by a reverse operation. By its removal the cover is left free, so that plates, vessels, or other articles can be placed thereon to be kept warm or for other purposes. One handle also can be applied to several covers, and when not in use can be removed and kept cool. When attached to a cover and the cover is placed under the hooks 3, the handle and cover together serve in place of a bail and enable the vessel covered thereby to be conveniently lifted. The upper bends of the S-shaped hooks of the wire portion of the handle will rest upon the cover when the handle is not in use and prevent its falling down upon the same.

9 indicates a supplementary vessel provided with similar hooks and adapted to receive the same or a similar cover. The vessel has a perforated bottom preferably and is provided with a skirt or flange 10, secured around it and bent outwardly, as represented. This flange is adapted to support said supplementary vessel in the top of another, as shown. It is cut away, as at 11, on opposite sides to adapt it to pass over the hooks 3, whereupon the supplementary vessel can be partially turned in a horizontal plane, and its flange 10 will thereupon become engaged in the hooks, substantially as heretofore described in connection with the cover. This connection having been made the lower steaming-vessel can be suspended in a kettle, and the handle and cover will act as a bail whereby to lift both vessels or to detach and lift the supplementary one. Obviously this use of the device is not limited to one supplementary steaming-vessel, as several could be placed one above the other.

Having thus described my invention, what I desire to secure by Letters Patent is—

1. The steaming-vessel provided with oppositely-placed hooks, each secured to said vessel at one end and having the outwardly-bent horizontal part 5 and the reversely-bent part 4, with a free end, said hooks being adapted to rest on a kettle and having a cover adapted to be slid laterally between the horizontal parts of the hooks, substantially as set forth.

2. The supplementary steaming-vessel having a notched horizontal flange 10, secured thereto on its exterior, combined with a vessel having the horizontal supplementary hooks 3, substantially as set forth.

3. The cover for a steaming-vessel, provided with grooves in its upper surface opening in opposite directions and provided with an elastic wire handle having the approximately S-shaped hooks adapted to be sprung into and out of said grooves, said hooks being also adapted to prevent the handle from falling upon the cover, substantially as set forth.

In testimony whereof I have signed this specification in the presence of two subscribing witnesses.

RICHARD C. ANDERSEN.

Witnesses:
    J. L. EDWARDS,
    WILLIAM BALLANCE.